United States Patent
Liu et al.

(10) Patent No.: US 10,661,219 B2
(45) Date of Patent: May 26, 2020

(54) SEPARATION OF NITROGEN FROM HYDROCARBON GAS USING PYROLYZED SULFONATED MACROPOROUS ION EXCHANGE RESIN

(71) Applicant: DDP SPECIALTY ELECTRONIC MATERIALS US, INC., Collegeville, PA (US)

(72) Inventors: Junqiang Liu, Midland, MI (US); Chan Han, Midland, MI (US); H. Robert Goltz, Midland, MI (US); Matthew L. Rodgers, Midland, MI (US); Scott T. Matteucci, Midland, MI (US); Brandon J. Kern, Midland, MI (US)

(73) Assignee: DDP SPECIALTY ELECTRONIC MATERIALS US, INC., Collegeville, PA (US)

( * ) Notice: Subject to any disclaimer, the term of this patent is extended or adjusted under 35 U.S.C. 154(b) by 108 days.

(21) Appl. No.: 15/535,434

(22) PCT Filed: Jan. 6, 2016

(86) PCT No.: PCT/US2016/012256
§ 371 (c)(1),
(2) Date: Jun. 13, 2017

(87) PCT Pub. No.: WO2016/122842
PCT Pub. Date: Aug. 4, 2016

(65) Prior Publication Data
US 2017/0368493 A1 Dec. 28, 2017

Related U.S. Application Data

(60) Provisional application No. 62/108,113, filed on Jan. 27, 2015.

(51) Int. Cl.
| | | |
|---|---|---|
| *B01D 53/08* | (2006.01) | |
| *B01J 20/28* | (2006.01) | |
| *B01J 20/30* | (2006.01) | |
| *B01J 20/26* | (2006.01) | |
| *B01J 20/20* | (2006.01) | |
| *B01J 20/34* | (2006.01) | |
| *B01D 53/02* | (2006.01) | |

(52) U.S. Cl.
CPC ............ *B01D 53/08* (2013.01); *B01D 53/02* (2013.01); *B01J 20/20* (2013.01); *B01J 20/267* (2013.01); *B01J 20/2808* (2013.01); *B01J 20/28061* (2013.01); *B01J 20/28064* (2013.01); *B01J 20/28085* (2013.01); *B01J 20/28092* (2013.01); *B01J 20/3078* (2013.01); *B01J 20/3416* (2013.01); *B01J 20/3441* (2013.01); *B01D 2253/206* (2013.01); *B01D 2253/308* (2013.01); *B01D 2256/24* (2013.01); *B01D 2256/245* (2013.01); *B01D 2257/102* (2013.01); *B01D 2259/40094* (2013.01); *B01J 2220/4812* (2013.01); *Y02C 20/20* (2013.01)

(58) Field of Classification Search
None
See application file for complete search history.

(56) References Cited

U.S. PATENT DOCUMENTS

| | | | |
|---|---|---|---|
| 1,875,199 | A | 8/1932 | Parkman |
| 2,493,911 | A | 1/1950 | Brandt |
| 2,495,842 | A | 1/1950 | Gilliland |
| 2,495,845 | A | 1/1950 | Jefferson et al. |
| 2,500,149 | A | 3/1950 | Boyer |
| 2,527,964 | A | 10/1950 | Robinson |
| 2,664,801 | A | 3/1951 | Eisbein |
| 2,631,127 | A | 3/1953 | D'Alelio |
| 2,642,417 | A | 6/1953 | Wheaton et al. |
| 2,764,564 | A | 9/1956 | McMaster et al. |

(Continued)

FOREIGN PATENT DOCUMENTS

| | | |
|---|---|---|
| GB | 1525420 | 9/1978 |
| JP | 2005194132 | 7/2005 |

(Continued)

OTHER PUBLICATIONS

Liu et al. "High throughput development of one carbon molecular sieve for many gas separations", Microporous and Mesoporous Materials (2014) pp. 207-216. (Year: 2014).*
Cavenati et al., Methane Purification by PSA from Natural Gas Sources, 2nd Mercosure Congress on Chemical Engineering, (2005).
Liu, J. et al. "High throughput development of one carbon molecular sieve for many gas separations" Microporous and Mesoporous Materials (2014).

(Continued)

*Primary Examiner* — Philip Y Louie
(74) *Attorney, Agent, or Firm* — Edward W. Black; Kenneth Crimaldi

(57) ABSTRACT

A method for separating $N_2$ from a hydrocarbon gas mixture containing $N_2$ comprising the steps of: i) providing a bed of adsorbent selective for $N_2$; (ii) passing the hydrocarbon gas mixture through the bed of adsorbent to at least partially remove $N_2$ from the gas mixture to produce: (a) $N_2$-loaded adsorbent and (b) $N_2$-depleted hydrocarbon gas mixture; iii) recovering the $N_2$-depleted hydrocarbon gas mixture; iv) regenerating the $N_2$-loaded adsorbent by at least partially removing $N_2$ from the adsorbent; and v) sequentially repeating steps (ii) and (iii) using regenerated adsorbent from step (iv); wherein the adsorbent comprises a pyrolized sulfonated macroporous ion exchange resin.

7 Claims, 1 Drawing Sheet

(56) References Cited

U.S. PATENT DOCUMENTS

| | | | |
|---|---|---|---|
| 2,960,480 A | 11/1960 | Thielen | |
| 2,992,544 A | 7/1961 | McMaster | |
| 3,037,052 A | 5/1962 | Bortnick | |
| 3,065,790 A | 11/1962 | Holm | |
| 3,116,130 A | 12/1963 | Miller | |
| 3,150,716 A | 9/1964 | Strelzoff et al. | |
| 3,266,007 A | 8/1966 | Sullivan | |
| 3,458,973 A | 8/1969 | Spencer et al. | |
| 3,554,904 A | 1/1971 | Humphries | |
| 3,729,457 A | 4/1973 | Davankov et al. | |
| 4,000,990 A | 1/1977 | Bingham | |
| 4,040,990 A | 8/1977 | Neely | |
| 4,070,446 A | 1/1978 | Horikiri et al. | |
| 4,191,813 A | 3/1980 | Reed et al. | |
| 4,197,133 A | 4/1980 | Zweifel et al. | |
| 4,224,415 A | 9/1980 | Meitzner et al. | |
| 4,256,840 A | 3/1981 | Meitzner et al. | |
| 4,263,407 A | 4/1981 | Reed, Jr. | |
| 4,297,220 A | 10/1981 | Meitzner et al. | |
| 4,322,394 A | 3/1982 | Mezey et al. | |
| 4,333,529 A | 6/1982 | McCorquodale | |
| 4,344,486 A | 8/1982 | Parrish | |
| 4,382,124 A | 5/1983 | Meitzner et al. | |
| 4,385,133 A | 5/1983 | Alberino et al. | |
| 4,419,245 A | 12/1983 | Barrett et al. | |
| 4,444,961 A | 4/1984 | Timm | |
| 4,522,975 A | 6/1985 | O'Connor et al. | |
| 4,528,000 A | 7/1985 | McGill et al. | |
| 4,564,644 A | 1/1986 | Harris | |
| 4,582,859 A | 4/1986 | Lein, Jr. et al. | |
| 4,623,706 A | 11/1986 | Timm et al. | |
| 4,655,807 A | 4/1987 | Ohmori et al. | |
| 4,666,673 A | 5/1987 | Timm | |
| 4,762,543 A | 8/1988 | Pantermuehl et al. | |
| 4,775,655 A | 10/1988 | Edwards et al. | |
| 4,839,331 A | 6/1989 | Maroldo et al. | |
| 4,857,084 A | 8/1989 | Robbins et al. | |
| 4,894,339 A | 1/1990 | Hanazato et al. | |
| 4,950,332 A | 8/1990 | Stringfield et al. | |
| 4,965,083 A | 10/1990 | Norman et al. | |
| 5,021,253 A | 6/1991 | Dawson-Ekeland et al. | |
| 5,059,578 A | 10/1991 | Marumo et al. | |
| 5,079,274 A | 1/1992 | Schneider et al. | |
| 5,094,754 A | 3/1992 | Maroldo et al. | |
| 5,098,880 A | 3/1992 | Gaffney et al. | |
| 5,104,530 A * | 4/1992 | Maroldo | B01J 20/20 210/198.2 |
| 5,134,169 A | 7/1992 | Green et al. | |
| 5,141,965 A | 8/1992 | Pike | |
| 5,167,899 A | 12/1992 | Jezic | |
| 5,171,333 A | 12/1992 | Maurer | |
| 5,217,505 A | 6/1993 | Maroldo et al. | |
| 5,231,115 A | 7/1993 | Harris | |
| 5,244,926 A | 9/1993 | Harris et al. | |
| 5,248,435 A | 9/1993 | Morita et al. | |
| 5,288,307 A | 2/1994 | Goltz et al. | |
| 5,300,468 A | 4/1994 | Senum et al. | |
| 5,330,468 A | 7/1994 | Burkhart | |
| 5,411,712 A * | 5/1995 | Woodmansee | B01J 8/02 219/679 |
| 5,460,725 A | 10/1995 | Stringfield | |
| 5,494,228 A | 2/1996 | Eaton et al. | |
| 5,504,163 A | 4/1996 | Tegen et al. | |
| 5,509,956 A | 4/1996 | Opperman et al. | |
| 5,616,622 A | 4/1997 | Harris et al. | |
| 5,683,600 A | 11/1997 | Kelley et al. | |
| 5,779,768 A | 7/1998 | Anand et al. | |
| 5,840,099 A | 11/1998 | Kratz et al. | |
| 5,855,650 A | 1/1999 | Kalbassi et al. | |
| 5,893,947 A | 4/1999 | Pease et al. | |
| 5,946,816 A | 9/1999 | Smith | |
| 5,972,834 A | 10/1999 | Ohsaki et al. | |
| 5,993,516 A | 11/1999 | Morris et al. | |
| 6,172,167 B1 | 1/2001 | Stapert et al. | |
| 6,423,658 B1 | 7/2002 | Thonnelier et al. | |
| 6,444,012 B1 * | 9/2002 | Dolan | B01D 53/047 95/105 |
| 6,562,110 B2 | 5/2003 | Koros et al. | |
| 6,562,113 B1 | 5/2003 | Aykanian et al. | |
| 6,585,802 B2 | 7/2003 | Koros et al. | |
| 6,656,252 B2 | 12/2003 | Kita et al. | |
| 6,726,746 B2 | 4/2004 | Dai et al. | |
| 6,756,462 B2 | 6/2004 | Pafford et al. | |
| 6,924,317 B2 | 8/2005 | Feistel et al. | |
| 7,066,986 B2 | 6/2006 | Haben et al. | |
| 7,247,191 B2 | 7/2007 | Koros et al. | |
| 7,282,153 B2 | 10/2007 | Barrett et al. | |
| 7,297,394 B2 | 11/2007 | Khemani et al. | |
| 7,410,525 B1 | 8/2008 | Liu et al. | |
| 7,476,659 B2 | 1/2009 | Hayashi et al. | |
| 7,815,987 B2 | 10/2010 | Mickols et al. | |
| 7,882,963 B2 | 2/2011 | Mickols et al. | |
| 7,897,797 B2 | 3/2011 | Emrick et al. | |
| 8,002,120 B2 | 8/2011 | Niu et al. | |
| 8,163,814 B2 | 4/2012 | Emrick et al. | |
| 8,268,047 B2 | 9/2012 | Allie | |
| 8,444,750 B2 | 5/2013 | Deckman et al. | |
| 8,529,664 B2 | 9/2013 | Deckman et al. | |
| 8,551,229 B2 | 10/2013 | Hufton et al. | |
| 8,574,348 B2 | 11/2013 | Struyf et al. | |
| 8,734,571 B2 | 5/2014 | Golden et al. | |
| 9,108,145 B2 | 8/2015 | Kalbassi et al. | |
| 9,169,367 B2 | 10/2015 | Matteucci et al. | |
| 9,186,650 B2 | 11/2015 | Carrunthers et al. | |
| 9,579,627 B2 | 2/2017 | Liu et al. | |
| 2002/0002267 A1 | 1/2002 | Long | |
| 2002/0036086 A1 | 3/2002 | Minkkinen et al. | |
| 2002/0150522 A1 | 10/2002 | Heim et al. | |
| 2004/0006145 A1 | 1/2004 | Dimotsis et al. | |
| 2004/0256597 A1 | 12/2004 | Barrett et al. | |
| 2005/0150379 A1 * | 7/2005 | Masetto | B01D 53/0462 95/148 |
| 2005/0211090 A1 | 9/2005 | McCullough | |
| 2006/0191410 A1 | 8/2006 | Dolan et al. | |
| 2008/0143014 A1 | 6/2008 | Tang | |
| 2008/0214743 A1 | 9/2008 | Broos et al. | |
| 2008/0282884 A1 | 11/2008 | Kelley et al. | |
| 2010/0126341 A1 | 5/2010 | Matteucci et al. | |
| 2011/0315012 A1 | 12/2011 | Kuznicki et al. | |
| 2012/0042689 A1 | 2/2012 | Bresler et al. | |
| 2012/0222552 A1 | 9/2012 | Ravikovitch et al. | |
| 2013/0192299 A1 | 8/2013 | Dolan et al. | |
| 2013/0220935 A1 | 8/2013 | Isacoff et al. | |
| 2013/0255490 A1 | 10/2013 | Matteucci et al. | |
| 2013/0291723 A1 | 11/2013 | Zhou et al. | |
| 2014/0338425 A1 | 11/2014 | Kalbassi et al. | |
| 2016/0122671 A1 | 5/2016 | Matteucci et al. | |
| 2016/0136614 A1 | 5/2016 | Matteucci et al. | |
| 2016/0145517 A1 | 5/2016 | Matteucci et al. | |
| 2016/0319210 A1 | 11/2016 | Matteucci et al. | |
| 2016/0333275 A1 | 11/2016 | Matteucci et al. | |
| 2016/0340595 A1 | 11/2016 | Matteucci et al. | |
| 2016/0340596 A1 | 11/2016 | Matteucci et al. | |
| 2016/0355743 A1 | 12/2016 | Matteucci et al. | |
| 2017/0066987 A1 | 3/2017 | Leister et al. | |
| 2017/0066988 A1 | 3/2017 | Leister et al. | |

FOREIGN PATENT DOCUMENTS

| | | |
|---|---|---|
| WO | 2008043964 | 4/2008 |
| WO | 2011084994 | 7/2011 |
| WO | 2015130339 | 9/2015 |
| WO | 2016018437 | 2/2016 |
| WO | 2016069316 | 5/2016 |
| WO | 2016122843 | 8/2016 |

OTHER PUBLICATIONS

H. Nakagawa, et al. "Control of micropore formation in the carbonized ion exchange resin by utilizing pillar effect," Carbon 37 (1999) 1455-1461.

Miura, K., "Preparation of novel porous carbons supporting metal nanoparticles and their applications to energy and environmental related issues" J. Ind. Eng. Chem., 11, No. 6, (2005) 797-817.

(56) References Cited

OTHER PUBLICATIONS

Neely, J. Characterization of Polymer Carbons Derived from Porous Sulfonated Polystyrene, Carbon 19 (1980) 27-36.

Ning et al., Carbon Molecular Sieve Membranes Derived from Matrimid® polyimide for Nitrogen/Methane Separation, Carbon 66 (2014) 511-522.

Tagliabue, et al., Natural Gas Treating by Selective Adsorption: Material Science and Chemical Engineering Interplay, Chemical Engineering Journal 155 (2009) 553-566.

* cited by examiner

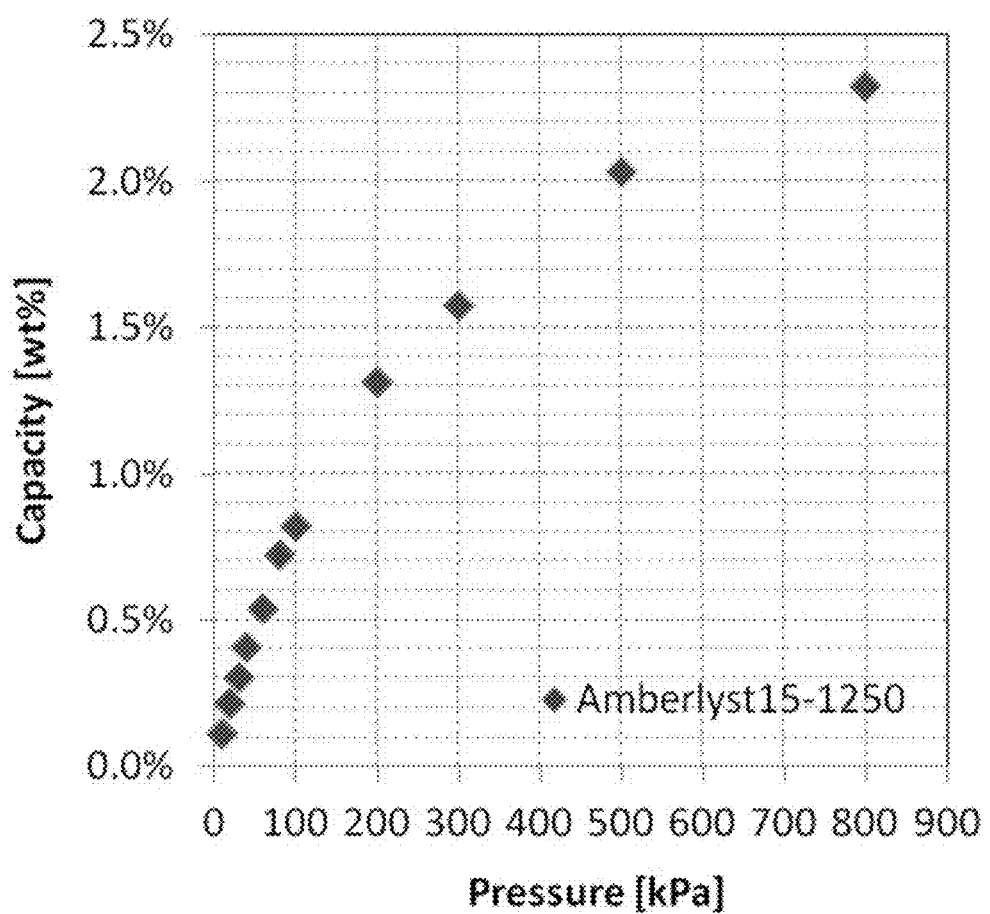

SEPARATION OF NITROGEN FROM HYDROCARBON GAS USING PYROLYZED SULFONATED MACROPOROUS ION EXCHANGE RESIN

FIELD

The invention relates to novel adsorbents and their use in separating nitrogen ($N_2$) gas from hydrocarbon-containing gas mixtures.

INTRODUCTION

Conventional methods of separating nitrogen ($N_2$) from hydrocarbon gas mixtures include cryogenic and membrane-based separations techniques. See for example Ning et al., Carbon Molecular Sieve Membranes Derived from Matrimid® polyimide for Nitrogen/Methane Separation, *Carbon* 66 (2014) 511-522. Another technique involves the use of a porous adsorbent that selectively adsorbs nitrogen ($N_2$) from the gas mixture. Specific examples include passing a process gas through a bed of adsorbent, e.g. zeolites, that preferentially adsorbs $N_2$ from the process gas stream. $N_2$ is subsequently desorbed from the adsorbent by either changing the pressure of the adsorbent bed (PSA) or heating the adsorbent (TSA). The following references describe systems employing pressure swing adsorption (PSA), vacuum swing adsorption (VSA) and temperature swing adsorption (TSA): U.S. Pat. Nos. 5,330,468, 6,423,658, 8,268,047, 8,529,664, 8,551,229, 8,444,750 and WO 2008/143964.

A variety of adsorbents have been used various gas separations including: aluminas, hydrotalcites, silicates, silica gels and clinoptilotics (U.S. Pat. No. 5,993,516). Carbonaceous adsorbents, sometimes referred to as "carbon molecular sieves," have also been described for use in the purification of hydrogen and the removal of water, methane, sulfur, carbon dioxide, nitrogen oxides and halocarbons from various fluid mixtures. See for example: U.S. Pat. Nos. 5,059,578, 5,217,505, 5,972,834 and US2013/0220935. See also Cavenati et al., Methane Purification by PSA from Natural Gas Sources, $2^{nd}$ *Mercosure Congress on Chemical Engineering*. Carbonaceous adsorbents are carbonized forms of carbon compounds such as coal, coke, peat, wood charcoal, net shell char, fruit nut char, coconut shell char, bone char, phenol resins, furan resins, and vinylidene chloride copolymers, see for example U.S. Pat. Nos. 5,300,468 and 5,972,834. WO2014/160624 describes the use a microporous carbon molecular sieve for separating alkenes from alkanes. The material comprises a non-melting binder and a non-porous gel type sulfonated ion exchange resin that are pyrolized a temperatures from 500 to 1000° C. Similar uses of pyrolized gel type sulfonated ion exchange resins are also discussed in: Liu, J. et al. "High throughput development of one carbon molecular sieve for many gas separations" *Microporous and Mesoporous Materials* (2014); Miura, K., "Preparation of novel porous carbons supporting metal nanoparticles and their applications to energy and environmental related issues" *J. Ind. Eng. Chem.*, 11, No. 6, (2005) 797-817, and Miura, K., et al. "Control of micropore formation in the carbonized ion exchange resin by utilizing pillar effect," *Carbon* 37 (1999) 1455-1461. Pyrolized sulfonated macroporous ion exchange resins are also described in the literature. See for example: Neely, J. Characterization of Polymer Carbons Derived from Porous Sulfonated Polystyrene, *Carbon* 19 (1980) 27-36, U.S. Pat. Nos. 4,040,990 and 4,839,331. An overview of various adsorbents and their use in gas separations are provided in: Tagliabue, et al., Natural Gas Treating by Selective Adsorption: Material Science and Chemical Engineering Interplay, *Chemical Engineering Journal* 155 (2009) 553-566. The search continues for new adsorbents along with more efficient methods of separating nitrogen from hydrocarbon gas mixtures.

SUMMARY

A preferred embodiment the invention includes an adsorbent along with its use in a method for separating $N_2$ from a hydrocarbon gas including the steps of: i) providing a bed of adsorbent selective for $N_2$; ii) passing the hydrocarbon gas mixture through the bed of adsorbent to at least partially remove $N_2$ from the gas mixture to produce: (a) $N_2$-loaded adsorbent and (b) $N_2$-depleted hydrocarbon gas mixture; iii) recovering the $N_2$-depleted hydrocarbon gas mixture; iv) regenerating the $N_2$-loaded adsorbent by at least partially removing $N_2$ from the adsorbent; and v) sequentially repeating steps (ii) and (iii) using regenerated adsorbent from step (iv); wherein the adsorbent includes a pyrolized sulfonated macroporous ion exchange resin. The ion exchange resin preferably includes a macroporous crosslinked copolymer matrix formed from polymerizing a reaction mixture e.g. styrene and divinylbenzene, that is subsequently pyrolized at a temperature of from 1200° C. to 1300° C. In preferred embodiments, the adsorbent has as an average micropore diameter of from 3.64 Å to 3.80 Å. A number of additional embodiments are described.

BRIEF DESCRIPTION OF THE DRAWINGS

Figure is a plot of nitrogen capacity versus pressure and corresponds to Example 1.

DETAILED DESCRIPTION

The subject adsorbent is prepared by pyrolizing a sulfonated macroporous ion exchange resin. Applicable ion exchange resin starting materials include commercially available resins such as AMBERLYST™ 15, a sulfonated macroporous type ion exchange resin available from The Dow Chemical Company. Preferred resins include a macroporous crosslinked copolymer matrix. The term "macroporous," sometimes also referred to as "macroreticular," refers to resins having both mesopores of from about 20 Å to about 500 Å and macropores of greater than about 500 Å. Such resins also preferably have a B.E.T. surface area of 200-600 $m^2$/g. In distinction, gel type ion exchange resins are characterized by only having micropore sizes less than about 20 Angstroms (Å) with no effective BET surface area. Surface areas may be determined by the classic B.E.T. nitrogen adsorption method in which dried and degassed samples are analyzed on an automatic volumetric sorption analyzer. The instrument works on the principle of measuring the volume of gaseous nitrogen adsorbed by a sample at a given nitrogen partial pressure. The volumes of gas adsorbed at various pressures are used in the B.E.T. model for the calculation of the surface area of the sample. The average pore radius is calculated from the relationship between the surface area and the pore volume of the sample, assuming a cylindrical pore geometry.

Suitable macroporous copolymer matrixes as well as their preparation are further described in U.S. Pat. Nos. 4,256,840 and 5,244,926—the entire contents of which are incorporated herein by reference. In brief, applicable macroporous crosslinked matrixes may be prepared by suspension polymerization of a finely divided organic phase comprising monovinyl monomers such as styrene, crosslinking monomers such as divinylbenzene, a free-radical initiator and a phase-separating diluent. The quantity of crosslinking monomer (e.g. amount of divinylbenzene) used in the reaction mixture to prepare the crosslinked copolymer matrix is preferably less than 20 wt % (e.g. 2 to 16 wt %). The polymerization forms a crosslinked copolymer matrix that may be subsequently sulfonated as per techniques well known in the art. See for example: U.S. Pat. Nos. 2,500,149, 2,631,127, 2,664,801, 2,764,564, 3,037,052, 3,266,007, 5,248,435, 5,616,622, US2002/002267 and US2004/0006145; relevant teachings of which are incorporated herein by reference. In general, sulfonated ion resins are prepared by reacting the copolymer matrix with a sulfonation agent, such as concentrated sulfuric acid (acid which has at least about 95 weight percent sulfuric acid based upon total weight), oleum, chlorosulfonic acid or sulfur trioxide, at a temperature and for a time sufficient to achieve a desired degree of sulfonation. A preferred sulfonation agent is concentrated sulfuric acid. The amount of concentrated sulfuric acid should be sufficient to provide adequate mixing during reaction, with a weight ratio of acid to beads of from about 2:1 to about 20:1 being generally sufficient. Typically, the acid and copolymer beads are maintained at a temperature from about 0° C. to about 200° C. for a time sufficient to obtain resin having a dry weight capacity of from 4.0 to 5.0 milliequivalents per gram (meq/g) and more preferably from 4.5 to 4.9 meq/g. Sulfonation may be conducted in the presence of a swelling agent. Representative swelling agents include: methylene chloride, ethylene dichloride, dichloropropane, sulfur dioxide, benzene, toluene, xylene, ethylbenzene, isopropylbenzene, chlorobenzene, nitrobenzene, nitromethane, tetrachloroethane and tetrachloroethylene. Contrary to the teaching of U.S. Pat. No. 4,839,331, use of oleum or other techniques utilized to achieve "polysulfonation" are not preferred and should be avoided. Descriptions of such resins along with techniques for their preparation are provided in: U.S. Pat. Nos. 4,256,840, 4,419,245, 4,444,961, 4,564,644, 4,582,859, 4,623,706, 4,666,673, 5,244,926, and 6,924,317—the entire contents of which are incorporated herein by reference.

While the ion exchange resin may take a variety of forms, e.g. powder, fiber, particle, pellet, granular; the ion exchange resin is preferably provided in bead form having a particle size diameter of 1 to 1000 microns, more preferably from 200-800 microns. The beads may have a Gaussian particle size distribution or may have a relatively uniform particle size distribution, i.e. "monodisperse" that is, at least 90 volume percent of the beads have a particle diameter from about 0.9 to about 1.1 times the volume average particle diameter.

The sulfonated ion exchange resins are preferably pyrolized by heating the ion exchange resins at temperatures of from 1200° C. to 1300° C., preferably under an inert atmosphere, e.g. nitrogen or argon, and preferably at 100 kPa for a few minutes to a few hours. For example, the resins may be heated in a graphite furnace to final temperature at a rate of 10° C./minute and then maintained at final temperature from 1 to 30 minutes before being allowed to cool. U.S. Pat. Nos. 4,040,990 and 4,839,331 describe applicable methodologies but higher temperatures are required for the present invention (i.e. temperatures from 1200° C. to 1300° C., more preferably 1225° C. to 1300° C.). See also: Neely, J. Characterization of Polymer Carbons Derived from Porous sulfonated Polystyrene, *Carbon* 19 (1980) 27-36.

The subject adsorbent is selective for nitrogen over methane. For purposes of the present invention, "selectivity" (S) is calculated according to equation 1 and is determined by a high throughput transient adsorption technique to measure the adsorption parameters (Henry's constant and Diffusivity) of $N_2$ and $CH_4$ separately at 35° C. and 1034 kPa (approx. 150 psig) according to the method described by: Ruthven D M, Reyes S C, Adsorptive separation of light olefins from paraffins, *Microporous Mesoporous Materials* (2007), 104(1-3):59-66.

$$S = \frac{K_{N2}}{K_{CH4}} \sqrt{\frac{D_{N2}}{D_{CH4}}} \quad (1)$$

where K stands for the Henry's constant of adsorption and D stands for the diffusivity. Selectivities as reported herein agree well with separation factors (Alpha) in final mixture gas PSA adsorption tests. Alpha is calculated by the $N_2$ and $CH_4$ concentrations in the feed and product effluent streams. The concentrations in the feed are designated as "x". The concentrations in the desorption step are designated as "y".

$$\text{Alpha} = \frac{(y_{N2}/y_{CH4})}{(x_{N2}/x_{CH4})} \quad (2)$$

In preferred embodiments, the $N_2/CH_4$ selectivity (and separation factor "alpha") are greater than 2, 3, 4, 5 or even 6.

In addition to selectivity, the adsorbent preferably has a relatively fast adsorption rate for nitrogen. For example, in a moving bed system, the feed gas is only exposed to the adsorbent for a limited time. As a consequence, a preferred adsorbent adsorbs $N_2$ relatively quickly, e.g. the time required to obtain a 50% equilibrium of $N_2$ "$t_{0.5\ N2}$" is less than 10 and more preferably less than 5 minutes and even more preferably less than 2 minutes.

The adsorbent also preferably has a good capacity for $N_2$. This dictates both the adsorbent particle size as well as the residence time for both the feed gas and the adsorbent in the adsorption chamber. The $N_2$ sorption capacity of the adsorbent should be at least 0.1 wt %, preferably at least 0.5 wt %, and more preferably at least 0.75 wt % at the conditions of operation (e.g., 20° C. and 100 kPa (approx. 760 mm Hg).

Micropore sizes below the kinetic diameter of $N_2$ (3.64 Å) are not believed to play a significant role in separation and pore sizes larger than the kinetic diameter of the hydrocarbon gas (e.g. 3.80 Å for methane) dilute the selective capability of the adsorbent and at some point render the adsorbent non-selective or hydrocarbon selective. Meso and macropore sizes larger than 20 Å are not believed to play a role in the selectivity but do impact rates of absorption. As a consequence, one preferred embodiment of the invention utilizes adsorbents having multimodal pore size including both macropores and micropores.

The subject adsorbents also preferably have an average micropore diameter no greater than 3.8 Å, (e.g. from 3.64 Å to 3.80 Å) as measured by placing an adsorbent in a vessel and monitoring adsorption. In conducting such a measurement, the sample adsorbent should be degassed at 150° C. for 4 hrs. The sample is then cooled to 20° C. and exposed to a pure test gas at 1034 kPa (approx. 150 psig) (e.g., $N_2$ or a hydrocarbon such as methane). Micropore size is determined by comparing the sorption properties of two gases of different kinetic diameter—a parameter for gases that is widely reported in the open literature. For example, in a system where $N_2$ has a low $t_{0.5\ N2}$ (i.e., less than 30 minutes) and $CH_4$ has a high $t_{0.5\ CH4}$ (i.e., greater than $2X\ t_{0.5\ N2}$), the pore size that dominates gas transport can is in the range of 3.64 Å and 3.80 Å. This technique can be used to determine the gas transport dominant pore size range.

The adsorbent also preferably has a total microporosity of from 0.1 to 0.3 ml/g based on a skeletal density ranging from 1.0 to 2.0 $g/cm^3$. In another embodiment, the adsorbent preferably has an average macropore diameter of from 1 to 1000 nm and a total macropore volume of at least 0.1-0.4 ml/g, both measured by mercury porosimetry.

In one embodiment the subject method includes the step of passing a pressurized hydrocarbon gas mixture through the bed of adsorbent to at least partially remove $N_2$ from the gas mixture to produce: (a) $N_2$-loaded adsorbent and (b) $N_2$-depleted hydrocarbon gas mixture. The configuration of the bed is not particularly limited and both packed and fluidized beds may be used but packed moving beds are preferred. Applicable beds include a pressurizable vessel or chamber that includes one or more gas inlets and outlets along with an opening(s) for transferring adsorbent, e.g. transferring out $N_2$-loaded adsorbent and transferring in fresh or regenerated adsorbent. Preferred operating conditions include: pressures from 400 to 1200 psi; residence times of 6 to 1800 seconds, more preferably 30 to 480 seconds; and space velocities through the bed of from 0.5 feet/second to 0.001 feet/second. Applicable hydrocarbon gas mixtures include methane and natural gas, e.g. gas mixtures containing predominantly methane with lesser quantities of heavier alkanes including propane and butane along with various impurities including nitrogen, carbon dioxide, hydrogen sulfide and various other gases. Other applicable gases include shale gas having relatively high quantities of nitrogen. In a preferred embodiment, the hydrocarbon gas mixture comprises from 2 to 40, and more preferably 5 to 20 mole percent of nitrogen ($N_2$). In another preferred embodiment, the gas mixture comprises from 50 to 90 mole percent methane. In yet another preferred embodiment, the carbon dioxide content of the hydrocarbon gas mixture is less than 20 mol %, 15 mol %, 10 mol % or more preferably less than 5 mol %. The carbon dioxide content of the hydrocarbon gas mixture may be reduced by way of well known techniques including the use of zeolites adsorbents. After passing through the bed of adsorbent, the $N_2$-depleted hydrocarbon gas mixture is recovered and may be subject to further treatment, transport, storage, etc.

Once the adsorbent becomes at least partially loaded with $N_2$, the adsorbent may be removed from the bed and discarded. Alternatively, the $N_2$-loaded adsorbent may regenerated. Regeneration involves at least partially desorbing $N_2$ from the adsorbent. Desorbed $N_2$ may be recovered or discarded. The process of regeneration may occur in same bed where adsorption occurred, or the adsorbent may be transferred to a separate bed (vessel). Regeneration involves exposing the adsorbent to at least one of: a) higher temperature and b) lower pressure (i.e. reduced $N_2$ partial pressure) as compared with conditions present during the step of $N_2$ adsorption. Applicable techniques for exposing the adsorbent to higher temperatures include heating the bed with electric or gas heaters, passing hot gas through the bed, and irradiating the adsorbent with microwave radiation (see for example U.S. Pat. Nos. 5,509,956, 5,946,816 and JP2005/194132). Irradiation with microwaves is a preferred approach. Techniques for reducing the pressure include venting the bed to an external tank or atmosphere. Pressures used during regeneration are preferably less than 70%, 50% or even 10% of the pressure used during the adsorption (loading) step. In some embodiments, vacuum pressure may even be used. The step of regeneration may be conducted as a batch, semi-batch or continuous operation and may include combinations of TSA, PSA and VSA.

In a preferred embodiment, the subject method involves the steps of:

i) providing a bed of adsorbent selective for $N_2$;

ii) passing the hydrocarbon gas mixture through the bed of adsorbent to at least partially remove $N_2$ from the gas mixture to produce: (a) $N_2$-loaded adsorbent and (b) $N_2$-depleted hydrocarbon gas mixture;

iii) recovering the $N_2$-depleted hydrocarbon gas mixture;

iv) regenerating the $N_2$-loaded adsorbent by at least partially removing $N_2$ from the adsorbent; and v) sequentially repeating steps (ii) and (iii) using regenerated adsorbent from step (iv).

In a preferred embodiment, step (i) occurs in an adsorption chamber, and step (iv) occurs in a desorption chamber, and $N_2$-loaded adsorbent is continuously transferred from the adsorption chamber to the desorption chamber, and regenerated adsorbent is continuously transferred from the desorption chamber to the adsorption chamber. Regeneration is preferably conducted by irradiating the adsorbent with microwaves. The adsorbent is selected based on the residence time of the adsorbent and the residence time of the feed gas in the adsorption bed. In this embodiment the adsorbent is not always exposed to the feed gas for sufficient time to saturate the adsorbent with $N_2$. The selectivity used for selection of the adsorbent can be adjusted such that the time (t) from Equation (1) can be either the residence time of hydrocarbon gas in adsorption chamber or the residence time of the adsorbent in the adsorption chamber. Control over this time (t) in this manner allows for optimization of adsorbent with feed gas that is not possible for a traditional batch process or semi-batch process. This approach also allows for higher selectivities, i.e. higher purity $N_2$-depleted hydrocarbon gas mixture per unit time of gas treatment as the adsorbents used in the present invention have higher $N_2/CH_4$ selectivities as the time of exposure decreases. Also, the continuous process allows for adsorbents with low $N_2$ capacity to be used as the invention does not require the adsorbents be run to saturation or even 50% of $N_2$ saturation. While different types of adsorbents may be used in combination, they preferably form a random or homogenous mixture forming a single packed moving bed. In a preferred embodiment, a single type of adsorbent is utilized.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. Combinations of beds may be used together, include different types of carbonaceous adsorbents within a single bed, or a series of beds using different types of adsorbents.

EXAMPLES

Example 1

300 g of macroporous sulfonated ion exchange resin (AMBERLYST™ 15) were pyrolized in a retort furnace, purged with nitrogen at a flow rate 25 $ft^3$ per minute (SCFM). The temperature was raised to 550° C. at a rate of 5° C./min and maintained for 15 min. The furnace was left to cool to room temperature and the resin was subjected to a second stage of pyrolysis in a graphite furnace under a 20 L/min flow of nitrogen. The furnace temperature was then raised at a rate of 10° C./min ramp and held at the indicated final temperature for 15 minutes. Sample 1-1: 850° C.; Sample 1-2: 1050° C., Sample 1-3: 1250° C.

The kinetics of adsorption for each sample were measured using a high throughput reactor (HTR) system installed in a triple dry box. The HTR system consists of a 6×8 array of parallel 14 milliliter stainless steel reactors which were used as sample holders. Adsorbate gases ($N_2$ and $CH_4$) were then injected into each cell at a controlled pressure and temperature. The kinetic adsorption measurements were performed in the following sequence: 1) Load 1.00±0.05 g of adsorbent into the 14.0 ml high throughput cells; 2) Degas at 140° C. for 12 hours by $N_2$ purge at atmospheric pressure semi-continuously; 3) Introduce the $N_2$ gas at 150 psi and monitor the pressure drop (for 12 hours) at 35° C.; 4) Degas at 140° C. for 24 hours by $N_2$ purge at atmospheric pressure; and, 5) Introduce the $CH_4$ gas at 150 psi and monitor the pressure drop (for 12 hours) at 35° C. Gas adsorption into the adsorbent is indicated by the pressure drop in the reservoir where the adsorbent is loaded. The adsorbed amount at time t, denoted as $M_t$ is calculated from the starting pressure ($P_0$), pressure at time t ($P_t$) and the reservoir volume (V) by the equation below. The adsorbed amount at equilibrium (infinite time), denoted as $M_{inf}$ is similarly calculated from the starting pressure ($P_0$), pressure at finish time ($P_{inf}$), and the reservoir volume (V). The uptake fraction ($M_t/M_{inf}$) is calculated from the pressures. The relationship between $M_t/M_{inf}$ and time, especially the adsorption half time ($t_{0.5}$) when $M_t/M_{inf}$ equals 0.5, is used to characterize the diffusion kinetics.

$$M_t = \frac{V}{RT}(P_0 - P_t) \quad (3)$$

$$\frac{M_t}{M_{inf}} = \frac{(P_0 - P_t)}{(P_0 - P_{inf})} \quad (4)$$

The gas diffusivities were obtained by fitting the uptake fraction with time, using equation below, were D stands for diffusivity (cm$^2 \cdot$s$-1$), t is time, r is the radius (cm) of the adsorbent, and n is integral number from 1 to infinity.

$$\frac{M_t}{M_{inf}} = 1 - \frac{6}{\pi^2}\sum_{n=1}^{\infty}\frac{1}{n^2}\exp\left(-\frac{n^2\pi^2 Dt}{r^2}\right) \quad (5)$$

Assuming Fickian diffusion, the diffusivity ratio can also be estimated based on the adsorption half times according to equation 6.

$$\sqrt{\frac{D_{N2}}{D_{CH4}}} = \sqrt{\frac{t_{0.5-CH4}}{t_{0.5-N2}}} \quad (6)$$

The ratio of Henry's constant can be calculated from the ratio of pressure drop (equation 7), where $N_2$ and $CH_4$ are treated as ideal cases during the high throughput adsorption tests.

$$\frac{K_{N2}}{K_{CH4}} = \frac{(P_0 - P_{inf})_{N2}}{(P_0 - P_{inf})_{CH4}} \quad (7)$$

Selectivities (S) were calculated as per equation (10). As shown in Table 1, samples pyrolized at temperatures below 1050° C. showed no $N_2/CH_4$ selectivity (and in fact showed slight selectivity for methane over nitrogen). The selectivity from the high throughput screening agreed well with the separation factor (calculated via equation 2) from the packed bed pressure swing adsorption test. Adsorbents obtained from 1250° C. pyrolysis of AMBERLYST 15 precursor, showed a selectivity of 6.9 (table 1) and a separation factor of 7 (Table 2).

TABLE 1

$N_2$ and $CH_4$ adsorption capacity and selectivity by high throughput screening

| Sample No. | Pyrolysis Temp. (° C.) | Δ $P_{N2}$ (psi) | $t_{0.5N2}$ (min) | Δ $P_{CH4}$ (psi) | $t_{0.5CH4}$ (min) | $N_2/CH_4$ Selectivity |
|---|---|---|---|---|---|---|
| 1-1 | 850 | 5 | 0.5 | 13 | 1.6 | 0.7 |
| 1-2 | 1050 | 4.6 | 0.6 | 12.7 | 1.5 | 0.6 |
| 1-3 | 1250 | 8.8 | 1.5 | 9.6 | 85 | 6.9 |

Example 2

300 g of macroporous sulfonated ion exchange resin (AMBERLYST™ 15) were pyrolized in a retort furnace according to the methodology described in Example 1. The furnace temperature was then raised at a rate of 10° C./min ramp and held at the indicated final temperature for 15 minutes. Sample 2-1: 1100° C.; Sample 2-2: 1200° C., Sample 2-3: 1250° C., Sample 2-3: 1300° C.

A stainless steel column (1.18 cm ID, 57.7 cm length) was packed with 10.0 g of adsorbent. Glass beads of 2 mm diameter were used to fill the rest of the space in the column. The column was heated by circulating heating fluid (Syltherm 550) from a heated bath (Neslab EX250) through a jacket made from one-inch tubing, into which the packed column was placed concentrically using reducing Tee fittings from Swagelok™. The column filled with 10.0 g of adsorbent was first purged by 200 sccm of helium at elevated temperature for 12 hours before cooling down to the adsorption temperature (20° C.). A 200 sccm of mixture gas (9 mol % $N_2$/91 mol % CH4) at 500 psig was fed to the column for the adsorption step. After the exit gas composition became comparable to the feed composition, the feed was switched to the purge gas (200 sccm of helium at 500 psig) for the desorption step. The exit gas composition was monitored by an online mass-spectrometer. The concentration of gases was normalized on a purge-gas free basis during the adsorption and desorption steps.

Breakthrough time is defined as the time when the raffinate gas concentration reaches 5% of that in the feed. The difference (delta) between $N_2$ and $CH_4$'s breakthrough time is a parameter showing the separation capacity of the adsorbent. The longer the delta breakthrough time, the higher is the separation capacity of the adsorbent. The separation factor is calculated using equation 2. As shown in table 2, the adsorbent from 1200° C. pyrolysis has the longest delta breakthrough time, or the highest $N_2/CH_4$ separation capacity. But the separation factor is only 4, which means a higher $CH_4$ loss due to the less selective adsorption. The adsorbent from 1300° C. pyrolysis has a shorter delta breakthrough time than the adsorbent from 1250° C., even though the separation factor between the two are comparable. The reduced separation capacity from 1250° C. to 1300° C. is a reflection of collapse of $N_2$ selective adsorbing micropores. So there appear to be an optimum pyrolysis window between 1200 and 1300° C. to reach a good balance between $N_2$ capacity and separation factor.

The selectivity (equation 1) from the high throughput screening agreed well with the separation factor (equation 2) from the packed bed pressure swing adsorption test. Adsorbent obtained from 1250° C. pyrolysis of AMBERLYST™ 15 precursor, showed a selectivity of 6.9 (table 1) and a separation factor of 7 (Table 2).

TABLE 2

| Sample No. | Pyrolysis temperature [° C.] | $N_2$ breakthrough time [min] | $CH_4$ breakthrough time [min] | Delta breakthrough time [min] | $N_2$ conc. in Effluent [%] | Separation factor (Alpha) [—] |
|---|---|---|---|---|---|---|
| 2-1 | 1100 | — | — | — | 1.4% | 0.1 |
| 2-2 | 1200 | 11.9 | 8.9 | 3.0 | 28% | 4 |
| 2-3 | 1250 | 10.7 | 8.4 | 2.3 | 40% | 7 |
| 2-4 | 1300 | 9.4 | 7.8 | 1.6 | 40% | 7 |

Example 3

Adsorbents were prepared, according to the method in example 1, by pyrolyzing at three different final temperatures using four different precursors: AMBERLYST™ 15, AMBERLYST 16™, AMBERLYST™ 35, AMBERLYST™ 36. The properties of the four precursors are shown in table 3. Much higher exchange capacities (sulfonation degree) were found in AMBERLYST™ 35 and AMBERLYST™ 36, which are sulfonated by a stronger sulfonation reagent oleum.

The Adsorbents were tested using the high throughput method same as example 1. As shown in table 4, the two precursors sulfonated by concentrated sulfuric acid (ion exchange capacity lower than 5 meq/g) generated adsorbent at 1250° C. pyrolysis that can separate $N_2/CH_4$. The two precursors sulfonated by oleum (ion exchange capacity higher than 5 meq/g) did not generate $N_2/CH_4$ selective adsorbent at all temperatures of pyrolysis.

The higher degree of sulfonation by oleum made a more stabilized structure that resist better pore shrinkage and collapse during the pyrolysis process. These adsorbents have always micropores that accept the larger $CH_4$ molecules freely, therefore no $N_2/CH_4$ molecular sieving. In order to shrink the micropore to the size of 3.64 to 3.8 Å, a less stabilized structure is needed to enable enough micropore shrinkage during pyrolysis. AMBERLYST™ 15, which has the lowest level of sulfonation (exchange capacity) is best suited to make adsorbents for $N_2/CH_4$ separations.

TABLE 3

| | Sulfonation agent | DVB content [wt %] | Exchange capacity [eq/kg dry] | Color of the dried resin |
|---|---|---|---|---|
| AMBERLYST 16 | Sulfuric acid | 12.0% | 4.8 | Brown |
| AMBERLYST 15 | Sulfuric acid | 18.5% | 4.7 | Grey |

TABLE 3-continued

| | Sulfonation agent | DVB content [wt %] | Exchange capacity [eq/kg dry] | Color of the dried resin |
|---|---|---|---|---|
| AMBERLYST 36 | Oleum | 12.0% | 5.4 | Dark black |
| AMBERLYST 35 | Oleum | 18.5% | 5.0 | Dark black |

TABLE 4

| Precursor | Pyrolysis Temp. (° C.) | $\Delta P_{N2}$ (psi) | $t_{0.5N2}$ (min) | $\Delta P_{CH4}$ (psi) | $t_{0.5CH4}$ (min) | $N_2/CH_4$ Selectivity |
|---|---|---|---|---|---|---|
| AMBERLYST 16 | 850 | 17.1 | 8.7 | 27.8 | 61 | 1.6 |
| AMBERLYST 16 | 1050 | 8.2 | 20.2 | 7 | 19.3 | 1.1 |
| AMBERLYST 16 | 1250 | 2.4 | 0.4 | 1.7 | 2.7 | 3.7 |
| AMBERLYST 15 | 850 | 5 | 0.5 | 13 | 1.6 | 0.7 |
| AMBERLYST 15 | 1050 | 4.6 | 0.6 | 12.7 | 1.5 | 0.6 |
| AMBERLYST 15 | 1250 | 8.8 | 1.5 | 9.6 | 85 | 6.9 |
| AMBERLYST 36 | 850 | 8.7 | 1.3 | 17.7 | 2.5 | 0.7 |
| AMBERLYST 36 | 1050 | 7.6 | 2.7 | 12.8 | 3.3 | 0.7 |
| AMBERLYST 36 | 1250 | 6.1 | 1.2 | 10.8 | 2.9 | 0.9 |
| AMBERLYST 35 | 850 | 0.7 | 6.1 | 14.2 | 1.6 | 0.0 |
| AMBERLYST 35 | 1050 | 5.2 | 0.7 | 13 | 2.3 | 0.7 |
| AMBERLYST 35 | 1250 | 5.8 | 0.9 | 12 | 3.1 | 0.9 |

The invention claimed is:

1. A method for separating $N_2$ from a hydrocarbon gas mixture containing $N_2$ comprising the steps of:
   i) providing a bed of adsorbent selective for $N_2$;
   ii) passing the hydrocarbon gas mixture through the bed of adsorbent to at least partially remove $N_2$ from the gas mixture to produce: (a) $N_2$-loaded adsorbent and (b) $N_2$-depleted hydrocarbon gas mixture;
   iii) recovering the $N_2$-depleted hydrocarbon gas mixture;
   iv) regenerating the $N_2$-loaded adsorbent by at least partially removing $N_2$ from the adsorbent; and
   v) sequentially repeating steps (ii) and (iii) using regenerated adsorbent from step (iv);
   wherein the adsorbent comprises a pyrolized macroporous sulfonated ion exchange resin having an average micropore diameter of from 3.64 Å to 3.80 Å; wherein the sulfonated macroporous ion exchange resin comprises a crosslinked macroporous copolymer matrix formed from polymerizing a reaction mixture of styrene and divinylbenzene; wherein the sulfonated macroporous ion exchange resin is pyrolized at a temperature from 1225° C. to 1300° C.; and wherein the sulfonated macroporous ion exchange resin has a dry weight capacity of from 4.5 to 4.9 milliequivalents per gram.

2. The method of claim 1 wherein step (i) occurs in an adsorption chamber, and step (iv) occurs in a desorption chamber, and wherein $N_2$-loaded adsorbent is continuously transferred from the adsorption chamber to the desorption chamber, and regenerated adsorbent is continuously transferred from the desorption chamber to the adsorption chamber.

3. The method of claim 2 wherein the adsorbent located in the adsorption chamber forms a packed moving bed.

4. The method of claim 1 wherein the step of regenerating the $N_2$-loaded adsorbent comprises irradiating the adsorbent with microwaves.

5. The method of claim 1 wherein the adsorbent has a $N_2/CH_4$ selectivity of greater than 5.

6. The method of claim 1 wherein the adsorbent has a $N_2$ capacity of greater than 0.5 wt %.

7. The method of claim 1 wherein the adsorbent has a $t_{0.5N2}$ of less than 5 minutes.

* * * * *